Dec. 1, 1936.  B. R. CARSON  2,062,396

AUTOMATIC PHONOGRAPH

Filed May 24, 1932  7 Sheets-Sheet 1

INVENTOR.
Benjamin R. Carson
BY J R Goldsborough
HIS ATTORNEY.

Dec. 1, 1936.  B. R. CARSON  2,062,396
AUTOMATIC PHONOGRAPH
Filed May 24, 1932  7 Sheets-Sheet 2

INVENTOR.
Benjamin R. Carson,
BY J. R. Goldsborough
HIS ATTORNEY.

INVENTOR.
Benjamin R. Carson,
BY R. Goldsborough
HIS ATTORNEY.

Dec. 1, 1936.  B. R. CARSON  2,062,396
AUTOMATIC PHONOGRAPH
Filed May 24, 1932  7 Sheets-Sheet 4

INVENTOR.
Benjamin R. Carson,
BY JR Goldsborough,
HIS ATTORNEY.

Dec. 1, 1936.  B. R. CARSON  2,062,396
AUTOMATIC PHONOGRAPH
Filed May 24, 1932  7 Sheets-Sheet 5

INVENTOR.
Benjamin R. Carson,
BY R. Goldsborough
HIS ATTORNEY.

Dec. 1, 1936.                B. R. CARSON                2,062,396
                           AUTOMATIC PHONOGRAPH
                           Filed May 24, 1932        7 Sheets-Sheet 6

INVENTOR.
Benjamin R. Carson,
BY J. R. Goldsborough
HIS ATTORNEY.

Dec. 1, 1936.  B. R. CARSON  2,062,396
AUTOMATIC PHONOGRAPH
Filed May 24, 1932  7 Sheets-Sheet 7

INVENTOR:
Benjamin R. Carson,
by R. Goldsborough
HIS ATTORNEY.

Patented Dec. 1, 1936

2,062,396

UNITED STATES PATENT OFFICE 2,062,396

AUTOMATIC PHONOGRAPH

Benjamin R. Carson, Camden, N. J., assignor to Radio Corporation of America, a corporation of Delaware Application May 24, 1932, Serial No. 613,198

15 Claims. (Cl. 274—10)

My invention relates to phonographs and, more particularly, to phonographs of the type comprising an automatic mechanism whereby a plurality of records may be reproduced in sequence. The present invention constitutes an improvement over the mechanism disclosed in the copending application of William D. La Rue, filed August 15, 1930, Serial No. 475,438, and assigned to Radio Corporation of America.

The principal object of my invention is to provide an improved automatic record changing mechanism which is extremely accurate in operation, comprises a minimum number of parts, and which is relatively inexpensive to manufacture.

A further object of my invention is to provide an improved automatic phonograph in which accurate return of a record into the record hopper or magazine is insured after a period of sound reproduction.

In accordance with my invention, it is a further object to effect accurate centering of a record on the turntable center-pin upon the discharge thereof from the record hopper or magazine.

Another object of my invention is to provide an automatic phonograph mechanism wherein provision is made for the manual reproduction of records which are of a different size than the records which the said mechanism is adapted to normally handle automatically.

A further object of my invention is to provide an automatic phonograph mechanism wherein the record magazine cooperates with a record transfer device in a manner calculated to permit only one record at a time to be fed from the magazine by the transfer device.

Another object of my invention is to provide an automatic phonograph mechanism with a safety device to protect the mechanism in the event that it becomes "jammed" either by itself, while in operation, or because of improper handling of the same by an inexperienced operator.

A further object of my invention is to provide, in an automatic phonograph mechanism, simplified means for raising and lowering the tone arm from and toward playing position.

A still further object of my invention is to provide an automatic phonograph mechanism which comprises a compact unit adapted to occupy a minimum of space in a cabinet.

Another object of my invention is to provide an automatic phonograph mechanism wherein the successive records to be played are not only positively removed from the magazine, but are also accurately centered on the turntable spindle as they are being removed.

A further object of my invention is to provide an automatic phonograph mechanism which cannot be stopped by a starting and stopping switch carried by the mechanism when the mechanism is in cycle; that is, should the said switch be moved to "off" or "stop" position when the mechanism is in cycle, or performing a series of automatic operations, the mechanism will continue to operate until the cycle is fully completed before stopping.

Another object of my invention is to provide an automatic phonograph mechanism which will continuously reproduce a stack or group of records supplied thereto and which will return a played record on top of the stack or group of records in the magazine.

A further object of my invention is to provide an automatic phonograph mechanism wherein the sound reproducing instrumentality is positively urged into initial cooperative engagement with the sound groove on a record to be reproduced.

Another object of my invention is to provide an automatic phonograph mechanism which, by a simple manipulation of a control lever, may be transformed from an automatic machine to a manually-operable machine, and vice versa.

A further object of my invention is to provide an automatic phonograph mechanism of which the various parts, including the record magazine and record elevating devices, may be controlled and set into operation by a single control device.

Another object of my invention is to provide an automatic phonograph mechanism wherein the record hopper or magazine presents a maximum supporting surface for a stack or group of records whereby warping of the records is prevented when a series of records remain in the magazine for extended periods of time.

The novel features characteristic of my invention are set forth with particularity in the appended claims. The invention itself, however, both as to its organization and its method of operation, together with additional objects and advantages thereof, will best be understood from the following description of a specific embodiment, when read in connection with the accompanying drawings, in which

Fig. 14 is a side elevation of the complete automatic mechanism with the rear end portion of the pick-up arm in section and illustrating the flexible elevating means connected thereto.

Fig. 15 is a sectional view on the line XV—XV of Fig. 12 with the parts which are shown in broken lines in Fig. 12 shown in full lines.

Referring more particularly to the drawings, the construction of my improved automatic mechanism will now be described in detail.

Figure 1:
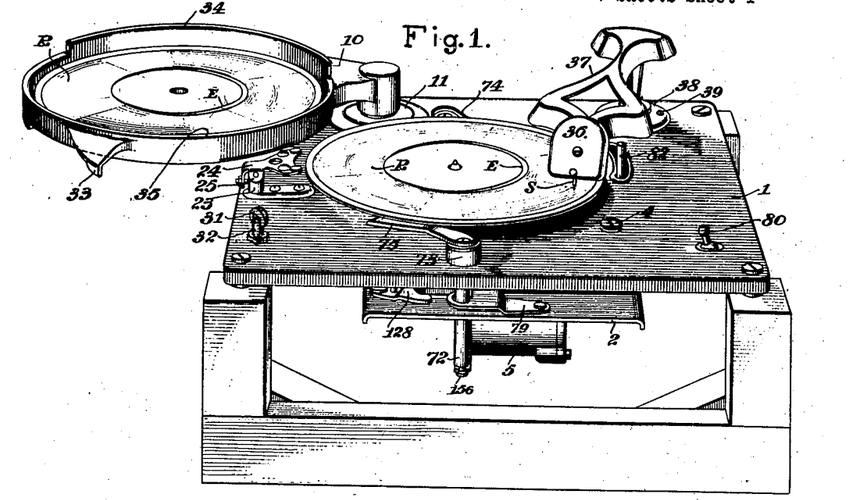
Figure 1 is a perspective view of my improved automatic phonograph mechanism mounted on a suitable display stand, and with the parts in sound reproducing position.

As shown in Figs. 1, 14 and 15, my improved mechanism comprises a top plate 1, usually referred to as a motorboard, having a mechanism assembly plate 2 attached thereto in spaced relation by means of a plurality of shouldered studs 3 carried by the plate 2 and detachably connected to the top plate 1 by a plurality of screw bolts 4, or the like, which pass through suitable openings formed in the top plate 1 and into the upstanding free ends of the studs 3.

A motor 5, provided with an upstanding turntable spindle 6, is secured to the underside of the assembly plate 2 by means of suitable screw bolts 7. The spindle 6 passes through an upstanding bushing or bearing sleeve 8 carried by the assembly plate 2 and extends to a point above the upper surface of the top plate 1 for receiving a turntable 9 thereon.

The top plate 1 is provided with a toggle switch 80 for controlling the motor 5, and an arcuate slot 81 through which an upstanding rod or post 82 projects for a purpose hereinafter described.

Record magazine

A magazine 10, adapted to support a plurality of record tablets R in superposed relation, is pivotally mounted on the top plate 1 adjacent to the turntable 9 in a bearing 11 by means of a pivot post 12 and is movable in an arcuate path to and from a position over the turntable. Movement is imparted to the magazine 10 through a crank arm 13, which is connected to the lowermost end of the pivot post 12 by means of a suitable set screw, the crank arm 13 carrying an upstanding crank pin 14 which projects into a slot 15 formed in one wing portion 16 of a cam plate 17 hereinafter more fully described.

The magazine 10 is substantially open bottomed but is provided with a plurality of oppositely disposed ledge portions 18 which are integral with and extend inwardly from the lowermost edge of the annular rim 19 comprising the magazine proper. The lower free edge portions of the annular rim 19 between the ledge portions 18 are recessed at diametrically opposite points to provide cutaway portions 20 and 21, the latter of which is still further cut away at 21a. A heel plate 22, formed on the outer periphery of the magazine rim 19 and extending laterally therefrom directly above the cutaway portion 20, serves to index the height of a record transfer lever hereinafter described whereby the lowermost record of a stack of records disposed in said magazine is engaged by said transfer lever when the magazine has been moved to a position directly over the turntable 9. The cutaway portions 20 and 21a formed in the annular rim 19 of the magazine and the substantially open bottom thereof provide a free path for the relative movement of the record transfer lever through the magazine between the innermost edges of the ledge portions, as clearly shown in Figs. 5 and 8.

Record transfer means

The mechanism for effecting transfer of a record from the magazine 10 to the turntable 9 is in the form of a yieldably mounted lever which cooperates with the magazine and the lowermost record therein during its movement to and from a position over the turntable to automatically dislodge the lowermost record laterally from the magazine onto the turntable after a played record has been removed therefrom. The record transfer mechanism comprises a pivot post 23 secured to the top plate 1 and to one side of the turntable 9 by means of suitable screws 23a or the like and a record engaging lever 24, which is pivoted transversely of the upstanding end portion of the pivot post 23 by means of a pair of turned down ears 25 formed on the lever 24 substantially intermediate its ends. A spring 26 cooperates with the pivot post 23 and the underside of the lever 24 to constantly urge the said lever upwardly. The opposite end of the lever 24 is turned down as at 27 and provided with an adjustment screw 28 and lock nut therefor. The inner end of the screw 28 engages the pivot post 23 to limit the upward movement of the lever in response to the spring 26. The laterally projecting free end of the lever 24 is provided on its upper side with a pair of spaced record engaging buttons 29 which extend upwardly from the lever a distance substantially equal to the thickness of a record tablet.

Formed in the surface of the lever rearwardly of each of the buttons 29 is a spherical projection 30 which is slightly higher than the buttons. In its movement to a position over the turntable, the lowermost record in the magazine contacts with the spherical projections 30 whereby the surface of the buttons 29 is held out of contact with the underside of that record, thus preventing scratching of the records.

When the magazine has reached a position directly over the turntable, the lever 24 is free to move upwardly until the buttons 29 engage the underside of the heel plate 22, cooperating with the cutaway portion 20 formed in the lowermost edge of the magazine rim 19, whereby the lever 24 is held in adjusted position so that the buttons 29 will engage the edge of only the lowermost record in the magazine. As the magazine returns from its position over the turntable (Figs. 5 and 6) to its normal or rest position at one side of the turntable (Figs. 1 and 2), the lever 24, through its buttons 29, will dislodge the lowermost record through the cutaway 21 so that the dislodged record will be deposited onto the turntable.

Means for temporarily supporting the overhanging weight of the magazine and its load of records, during a part of its movement to and from a position over the turntable 9, is provided in the form of a roller 31 which is pivoted in the slotted end of an upstanding stud 32 attached to the top plate 1 in a position where the bottom edge of the magazine rim 19, at its outermost point, will contact with the roller 31. In order to more positively guide a record being discharged from the magazine 10 onto the turntable 9, the outer periphery of the magazine rim 19 is provided with an integral projecting finger 33 which is adapted to engage the periphery of a record as it emerges from the magazine during the movement of the magazine away from the turntable 9, the finger 33 preventing lateral movement of the record about to be discharged. The finger 33 thus assists in properly centering the discharged record on the turntable spindle.

Figure 8:
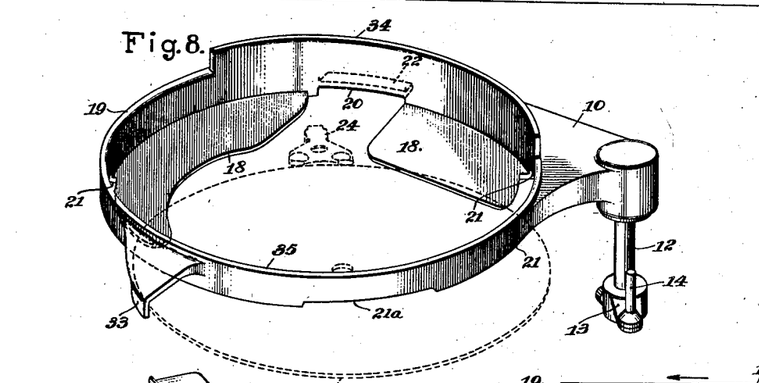
Fig. 8 is a perspective view of the magazine illustrating the manner in which a record tablet, shown in dotted lines, is ejected therefrom by the cooperation therewith of the record transfer lever, also shown in dotted lines, and the means formed on the magazine for assisting in temporarily guiding the ejected record.

As clearly shown in Figs. 1 and 8, the upper edge of the magazine rim 19 is higher throughout a portion of its periphery, as indicated at 34, than the remaining portion of the rim as indicated at 35. The purpose of the higher wall portion of the magazine rim 19 is to center a played record directly over the magazine 10 and to insure its entry therein when the record is finally released by record elevating mechanism hereinafter described.

*Pick-up device, supporting post and trip lever*

Figure 11:
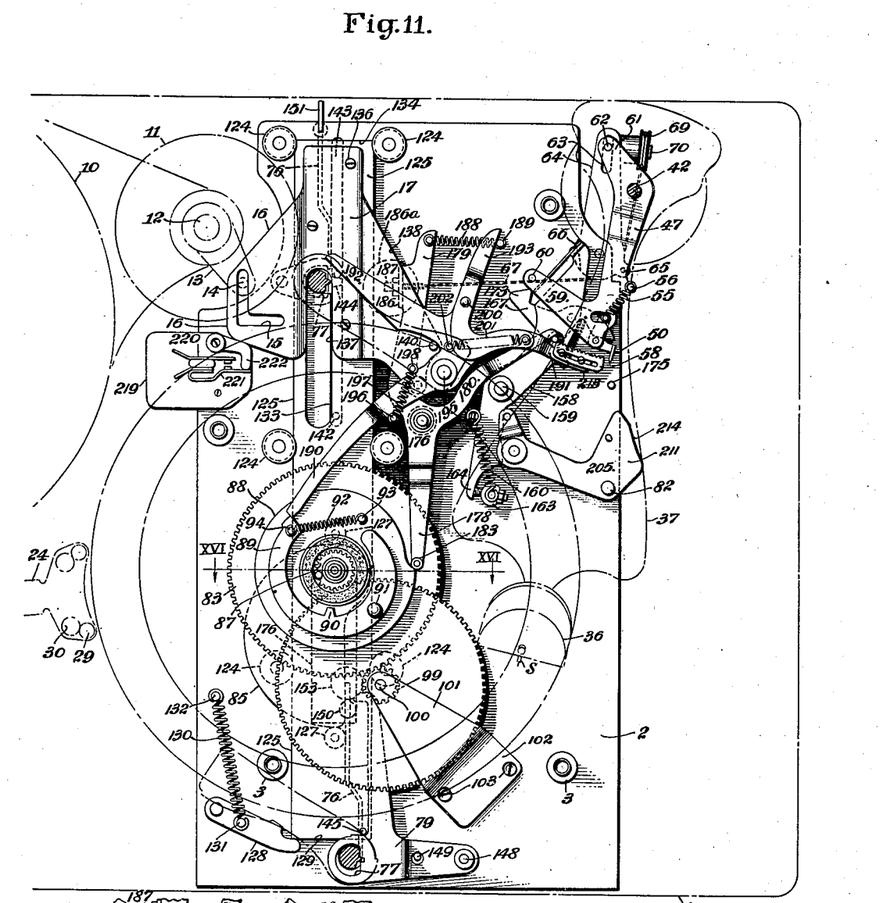
Fig. 11 is a top plan view of the automatic mechanism which is suspended from the top plate or motor board illustrating the parts thereof in the position they assume at the completion of an automatic cycle of operations, the motor board and the parts mounted thereon being shown in broken lines to illustrate their cooperative relation with the automatic mechanism.
Figures 12, 13:
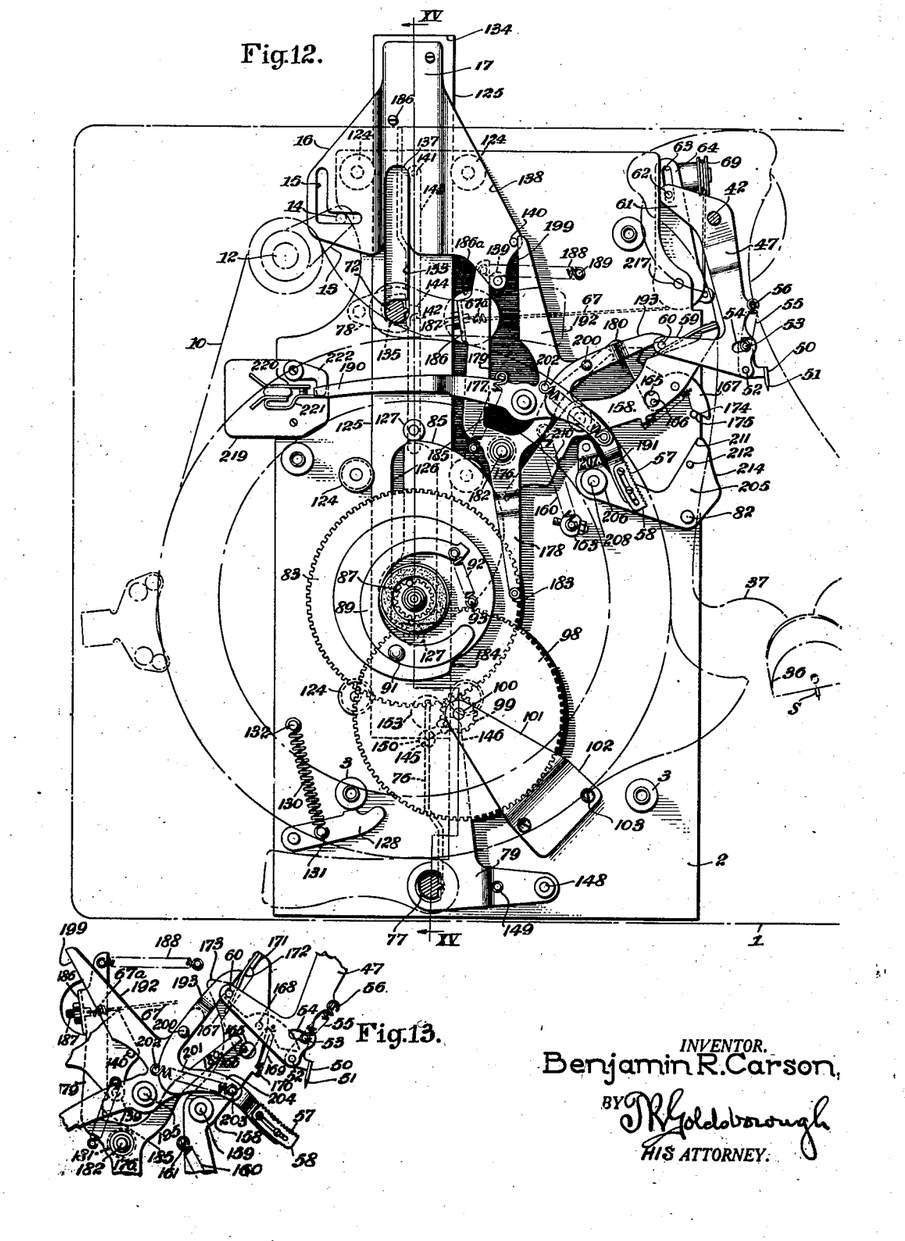
Fig. 12 is a view similar to Fig. 11 illustrating the mechanism with its parts in one position they occupy during a cycle of automatic operations.
Fig. 13 is a fragmentary detail view illustrating certain parts of the mechanism shown in Figs. 11 and 12 in still another position.

As clearly shown in Figs. 11, 12 and 14, a sound reproducing instrumentality, for example an electric pick-up device 36 carried by a supporting arm 37, is pivotally mounted on the top plate 1 in spaced cooperative relation with the turntable 9 by means of a flanged bearing plate 38 which is disposed in a suitable aperture formed in the top plate 1 and secured thereto by means of suitable screws or the like 39.

The bearing plate 38 is provided with a central bearing opening 40 and an integral centrally depending bearing sleeve 41 for the pivotal reception of a tubular stem 42 carried by a pivot post 43 on which the supporting arm 37 is mounted.

The upper end portion of the pivot post 43 terminates in a laterally extending arm 44 having a vertically disposed adjustment screw 45 threaded in the free end of the arm 44. The screw 45 serves to support the weight of the pick-up 36 and its arm 37 when out of contact with a record, so that a cable 67, hereinafter more fully referred to, will not be stretched.

The pick-up arm 37 is, preferably, of the counter-balanced type shown and described in a copending application of James M. Kendall, filed March 12, 1931, Serial No. 521,936, and also assigned to the Radio Corporation of America, and is pivoted, at a point substantially adjacent its rear end portion, to the uppermost vertical portion of the pivot post 43 by a suitable pivot pin 46 with the over-hanging forward portion of the pick-up arm normally resting on the adjustment screw 45.

The lowermost free end portion of the tubular stem 42 extends a suitable distance below the bearing sleeve 41 for the attachment thereto of a trip lever 47 which comprises a substantially L-shaped member having a collar 48 staked or otherwise secured thereto intermediate its ends. The collar 48 is provided with suitable set screws 49 whereby the trip lever 47 is secured to the stem 42 for movement therewith.

A pawl 50 having a vertically disposed knife edge 51 formed on one end thereof is pivoted intermediate its ends on one limb of the trip lever 47 as indicated at 52. The other end of the pawl 50 is provided with an upstanding pin 53 which projects through a slot 54 formed in the said limb for limiting the pivotal movement of the pawl 50 relative to the lever 47. A spring 55, having one of its ends connected to the pin 53 and its other end to an upstanding lug 56 formed on one edge of the said limb of the trip lever 47, constantly urges the pawl 50 in a clockwise direction to maintain its knife edge 51 in engagement with the serrated edge 57 of a ratchet plate 58 which is carried by mechanism hereinafter described.

The free end of the limb 59 of the trip lever 47 is provided with a depending pin 60 which is adapted to be periodically engaged by mechanism also hereinafter described for moving the pick-up arm to and holding it in certain predetermined positions, as hereinafter described.

The remaining limb 61 of the trip lever 47 is also provided with a depending pin 62 which extends into a slot 63 formed in a pivotally mounted arm 64, also hereinafter more fully described, whereby the arm 64 is moved either in a clockwise or counter-clockwise direction in accordance with the movements of the trip lever 47 and the pick-up arm 37.

A pin 65 (Figs. 11 and 14) carried by the arm 64 depends therefrom to one side of a pulley 66 for maintaining the cable 67 in the groove of said pulley. The opposite free end portion of the arm 64, or the end which is provided with the elongated slot 63, carries an integral depending arm 68. A second grooved pulley 69 is pivoted to the depending arm 68 by means of a shouldered pivot pin 70. Another pin 71, carried by the depending arm 68 adjacent its lowermost end, projects laterally therefrom directly below the pulley 69 to maintain the cable 67 in the groove of said pulley, as clearly shown in Figs. 11 and 14.

The elongated slot 63 formed in the arm 64 described above, and providing for the reception of the depending pin 62 which is carried by the hereinbefore described trip lever 47, provides the means whereby motion is imparted to the arm 64 in accordance with the pivotal movement of the pick-up arm supporting post 43 and its tubular pivot pin 42 to the lowermost end of which the trip lever 47 is secured. This movement of the arm 64 with the pick-up arm supporting post 43 maintains the pull of the cable 67 directly over the center of revolution of the pick-up arm supporting post, thus insuring against the cable 67 being guided off the vertical center of the pick-up arm supporting post 43 and the pulleys 66 and 69.

Record elevating means

A pair of vertically reciprocable standards 72, each provided with a projecting key or spline 72' formed lengthwise thereof and along a major portion of their length, are journaled in a like number of suitable bearing sleeves 73 which are secured in and pass through suitable apertures formed in the top plate 1. A pair of record elevating fingers 74 and 75 are secured to the uppermost ends of the standards 72 and occupy a position above the top plate 1. The elevating fingers 74 and 75 normally lie in a plane slightly below the upper face of the turntable 9 and are disposed with respect to each other at diametrically opposite points of the turntable, extending in opposite directions so as to support a record tablet in a non-tilting manner when elevated above the turntable 9. The record supporting surface of the front elevating finger 75 is provided with a rubber or other suitable friction pad 76.

When the elevating fingers 74 and 75 support a record in elevated position above the turntable 9 and are rotated in a counter-clockwise direction, by mechanism hereinafter described, from under said record, the rubber covering 76 by reason of its frictional engagement with the record, draws it slightly to a position where it is substantially concentric with the magazine 10 so that the elevated record will fall centrally thereinto.

The front elevating finger 75, in its counter-clockwise movement conjointly with the rear elevating finger 74, cooperates with the highest magazine edge portion 34, when the magazine is in a position directly over the turntable 9, to guide the record, upon its release from the elevating fingers 74 and 75 and during its movement by gravity into the magazine, to insure the complete entry of a record so released into the magazine 10.

The lowermost ends of the standards 72 pass through the base plate 2 for cooperative engagement with a pair of cam levers 76, hereinafter more fully described, whereby the standards are periodically elevated, as clearly shown in Fig. 15. One of the standards 72 also passes through a notched or splined opening 77 formed in a lever 78, while the other standard 72 passes through a similar opening 77 in a T-shape lever 79. The levers 78 and 79 are each pivoted at one of their ends, the former to the underside and the latter to the upper side of the base plate 2, with their complemental openings 77 in alignment with the openings in the base plate 2 through which their respective standards 72 pass. The standards 72 are periodically rotated by the pivoted levers 78 and 79 which, in turn, are actuated by a single control member hereinafter described.

Turntable drive and associated mechanism

The motor 5 is, preferably, although not necessarily, of the constant speed induction type and, when energized, normally rotates at a speed such that the turntable spindle 6 is rotated through a suitable reduction gear mechanism at a speed of 78 R. P. M. The aforesaid reduction gear mechanism, the spindle 6, and the motor 5 are, preferably, all combined in a single unit.

A gear 83, mounted on a bearing hub 84, carries a cam plate 85 which is eccentrically pivoted on the hub 84 and pinned to the gear 83 for positive rotation therewith, the whole being revolubly mounted on the sleeve 8. The hub 84 is positioned lowermost on the sleeve 8, so that the gear 83, carrying the cam plate 85, will be spaced from the upper surface of the assembly plate 2.

A shouldered sleeve 86 having a pinion gear 87 formed on the lower end portion thereof is rotatably mounted on the spindle portion which projects through the upper end of the sleeve 8, a clutch plate 88 being suitably staked to a shoulder formed intermediate the ends of the sleeve 86.

A crescent-shape pawl 89, having an inwardly projecting tooth 90 formed thereon, is pivotally mounted on the upper face of the clutch plate 88, by means of a pivot pin 91, and is urged toward the axial center of the clutch plate 88 by means of a spring 92. The spring 92 is anchored, at one end, to a pin 93 on the clutch plate 88, and at the other end, to a pin 94 carried by the pawl 89.

Cooperating with the crescent pawl 89 is a ratchet sleeve 95 having a plurality of spaced recesses or notches 96 formed in the periphery thereof, the sleeve 95 being secured to a turntable supporting collar 97 mounted on the spindle 6 by means of a set screw 97a, as clearly shown in Fig. 15. The turntable supporting collar 97 is so positioned on the spindle 6 that the notched peripheral portion of the ratchet sleeve 95 extends slightly below the top surface of the pawl 89 for cooperative engagement therewith when the pawl 89 is released for movement toward the ratchet sleeve 95. When the pawl 89 is released for engagement with the ratchet sleeve 95, in a manner hereinafter described, the pawl tooth 90 will seat in one of the notches 96 formed in the ratchet sleeve 95 and cause rotation of the pinion gear 87. The gear 87 meshes with an intermediate gear 98 to which is coupled a pinion gear 99, rotatable as a unit therewith. The gear 98 and pinion 99 are rotatably mounted on a pivot pin 100 secured to and depending from the free, overhanging end 101 of an offset bracket plate 102 which is spaced from the spindle 6 in accordance with the respective diameters of the gears and pinions above described and is secured on the upper surface of the assembly plate 2 by means of screws 103, as clearly shown in Figs. 11 and 12. Inasmuch as the pinion 99 meshes with the cam gear 83, rotation of the pinion gear 99, through the gears 87 and 98, will impart rotation to the cam gear 83.

Figures 17, 18, 19:
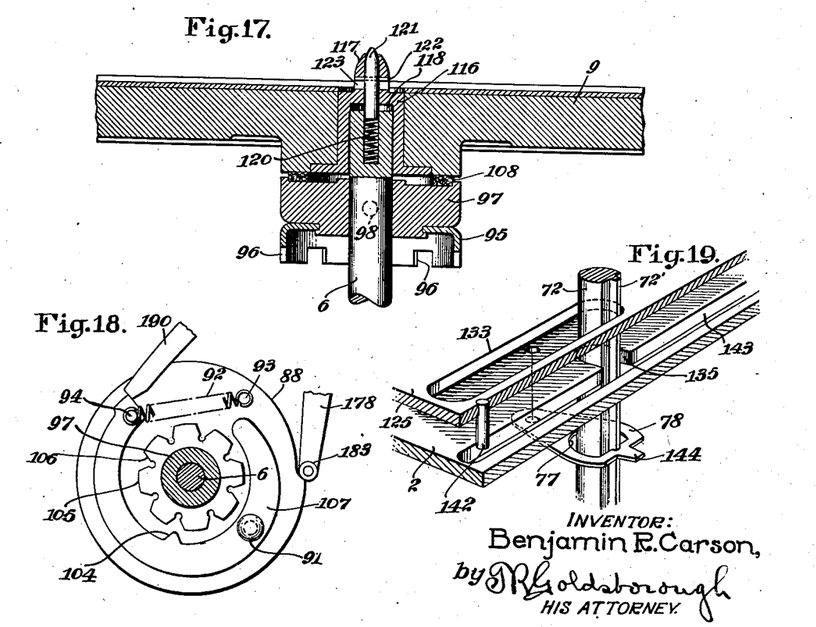
Fig. 17 is a similar view illustrating a modification of the contruction illustrated in Fig. 16.
Fig. 18 is a top plan view of a modified form of pawl and ratchet clutch.
Fig. 19 is an exploded sectional detail view, in perspective, of a portion of the base plate and actuating bar, illustrating the connection thereto of one of the elevating standards.

The pawl and ratchet clutch comprising the clutch plate 88, the crescent shape pawl 89, spring 92 and the ratchet sleeve 95 may, under certain circumstances, conform in design to a similar clutch embodying certain modifications as illustrated in Fig. 18 wherein an inwardly projecting tooth 104 has a rounded nose with its sides diverging therefrom in V-shape formation. A ratchet plate 105 cooperates with the tooth 104 and has a number of recesses or notches 106 formed in its periphery, the contour thereof corresponding substantially in angularity to that of the tooth 104 formed on the crescent shape pawl 107. The arrangement is such that when an automatic phonograph mechanism of the type herein described is equipped with the above noted clutch modification, the motor driving the said mechanism will continue to rotate although the mechanism may, for some reason, have become jammed or overloaded, provided, of course, that the power supplied to the motor has not been shut off.

In cases of this kind, the ratchet plate 105 continues to rotate with the spindle 6. Consequently, the V-shape recesses or notches 106 in the periphery thereof will cause the pawl tooth 104 to be forced successively out of the V-shape notches 106 against the action of the pawl spring 92 until the mechanism is freed or the circuit to the motor interrupted. In other words, the clutch plate 88 and pawl 107 are held against rotation when the mechanism to which they transmit motion is jammed. Hence, the associated rotating ratchet plate 105 cannot drive the clutch plate 88, and as a result thereof, the V-shape notches 106 in the ratchet sleeve 105 successively pass the V-shape tooth 104.

The turntable supporting collar 97 has its upper face counterbored for loosely receiving an annular friction washer 108 of leather, hard fibre or similar material. A further element in the form of an upstanding pin 109 (Fig. 15) is doweled in the collar 97 within the confines of the washer 108 and offset with respect to the spindle 6.

A spring influenced pin 110 is carried by the turntable 9 and extends vertically through the turntable proper and a boss or hub depending centrally therefrom. The pin 110 projects from the bottom face of the hub into the path of the upstanding pin 109 when the turntable is positioned on the spindle 6 in supporting contact with the friction washer 108 as more fully described in my copending application, Serial No. 487,115, filed October 8, 1930, and assigned to the Radio Corporation of America.

The turntable drive arrangement so far described is effective for rotating the turntable 9 at a standard speed of 78 R. P. M. Under certain circumstances, however, it is desirable that the turntable 9 be optionally rotatable at a slower speed as, for example, 33⅓ R. P. M., as well as at the standard speed of 78 R. P. M., without altering the speed of the motor 5 and/or the reduction gear drive mechanism associated therewith.

In order to obtain a turntable speed of either 33⅓ R. P. M. or 78 R. P. M., at the option of the operator, a manually controlled two-speed turntable drive mechanism may be interposed between the ratchet sleeve 95 and the turntable 9 as fully disclosed in my copending application, Serial No. 512,244, filed January 30, 1931, and assigned to the Radio Corporation of America.

The upper end of the spindle 6 normally extends above the top surface of the turntable 9 and acts as a centering pin for the record tablets R. To facilitate passage of the spindle 6 proper into the respective central openings in the records R, and to assist the magazine 10 and the projection 33 formed thereon in centering a record on the spindle 6, the free end portion thereof is suitably tapered and provided with a central bore 111 for the reception of a spring 112 and a pin 113 which has its upper end also suitably tapered or pointed. The pin 113 is yieldably maintained in the bore 111 against the action of the spring 112 by means of a relatively small pin 114 which is carried by the pin 113 and projects laterally therefrom through an opening 115 formed in the wall of the tapered end portion of the spindle 6, as clearly shown in Fig. 16.

Figure 16:
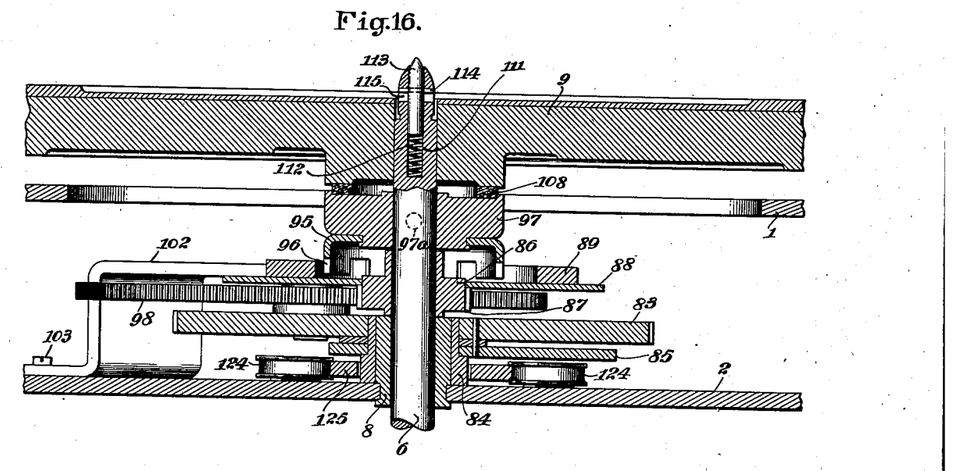
Fig. 16 is an enlarged sectional view on the line XVI—XVI of Fig. 11.

A modification of the yieldable center pin 113 described in connection with Fig. 16 is illustrated in Fig. 17 wherein the turntable 9 is provided with a flanged bushing 116 which is pressed into the central opening formed in the turntable from the bottom side thereof. The upper end of the bushing terminates in a reduced end portion 117 which has its free end slightly tapered and which serves as a turntable center pin adapted to enter the central openings in the respective record tablets R. The bushing 116 is further provided with a bore 118 which receives the upper end portion of the spindle 6 when the turntable 9 is rotatably mounted thereon, as clearly shown in Fig. 17. The bore 118 commences at the flanged end of the bushing 116 and extends substantially to a point near the beginning of the reduced end portion 117 where the bore 118 terminates into a smaller bore 119 and continues through the reduced end portion 117.

Similar to the construction shown in Fig. 16, the upper end portion of the spindle 6 shown in Fig. 17 is provided with a spring 120 against which bears the lower end of a pointed pin 121 when the turntable 9 is positioned on the spindle 6. The pin 121 is yieldably maintained against the action of the spring 120 by means of a small pin 122 which is doweled in the pin 121 and projects laterally therefrom into an opening 123 formed in the wall of the reduced end portion 117 of the bushing 116.

In phonograph mechanisms of the type wherein records may be reproduced at different speeds, as in the phonograph herein described, it is preferable to have the turntable always rotate at the same speed as that of the spindle when such a mechanism is in operation. The reason for this is that if the turntable spindle rotates at a speed other than that of the turntable (and hence of the record resting thereon), the friction between the spindle and the edge of the center opening in the record causes wear of said edge, enlarging the same, and thereafter precluding proper centering of the record about the spindle. Accordingly, when the turntable is rotating at one predetermined speed, as for example, 78 R. P. M., a turntable spindle of the type illustrated particularly in Figs. 15 and 16 is preferably employed. However, when it is desirable that the turntable be rotated at one or the other of two predetermined speeds, as for example, 78 R. P. M., and 33⅓ R. P. M., a turntable spindle of the type illustrated in Fig. 17 is preferably employed.

Automatic mechanism

The mechanism assembled on top of the assembly plate 2 functions to automatically actuate, in a predetermined sequence, the various instrumentalities hereinbefore specifically described. The mechanism is periodically controlled by a reciprocable member which, in turn, is actuated by the cam 85 when the motor 5 is in operation.

Carried by the assembly plate 2 are a plurality of spaced double flanged rollers 124 which are suitably pivoted thereto and disposed in two parallel rows which extend in the direction of the length of the assembly plate 2. A slide bar 125, having an elongated slot 126 formed centrally therein adjacent its lower end, as viewed in Fig. 11, and in central alignment with the spindle 6, is disposed between the two rows of rollers 124 and rides on the flanged peripheries thereof. The width of the slot 126 is such that the upstanding bushing or sleeve 8 carried by the plate 2 is clear of the marginal edges thereof for the reception, between the edges of the slot and the sleeve 8, of the hub 84 on the gear 83 revolubly mounted on the sleeve 8. The slot 126 is of such a length as to permit the bar 125 to reciprocate a predetermined distance longitudinally of the plate 2.

A pair of rollers 127 are pivoted on the upper side and in the center of the slide bar 125 adjacent each end of the slot 126 being spaced apart a distance substantially equal to the longest diameter of the semi-circular cam 85 carried by the gear 83. During a cycle of automatic operations, the rollers 127 are alternately engaged by the periphery of the cam 85 as it completes one revolution, whereby the slide bar 125 is first moved from its normal position of rest, as shown in Fig. 11, to the position shown in Fig. 12 and then returned to the position shown in Fig. 11, during which time, a cycle of automatic operations performed by the mechanism has been completed.

A lever 128, pivoted to the assembly plate 2 at a point adjacent the lower left hand corner thereof as viewed in Figs. 11 and 12, engages the end 129 of the slide bar 125 in the manner illustrated in Fig. 11. The lever 128 is tensioned by means of a spring 130 which is anchored to the lever 128 by means of an upstanding pin 131 carried thereby and another upstanding pin 132 carried by the assembly plate 2. One of the studs 3 serves as an abutment for the lever 128 when the end 129 of the slide bar 125 has moved to the position illustrated in Fig. 12. The purpose of the tensioned lever 128 is to transmit a longitudinal thrust to the slide bar 125 in order to lessen the load on the motor 5 at the start of a cycle of automatic operations. The lever 128 also serves to hold the slide bar 125 in check when it is moving in the direction indicated by the arrow in Fig. 12 so that the bar 125 cannot slide ahead of the cam 85.

Another elongated clearance slot 133 is formed in the slide bar 125 adjacent its end 134 in alignment with a U-shape opening 135 formed in the assembly plate 2, and through which one of the standards 72 passes to permit movement of the slide bar 125 relative to the said standard 72, as clearly shown in Figs. 11 and 12. The cam plate 17, previously described, is attached to the slide bar 125, as by screws or the like 136, so that the cam plate 17 will move as a unit with the slide bar. A slot 137 is cut inwardly from the edge of the cam plate 17 so as not to obstruct the slot 133 in the slide bar 125.

The cam plate 17 includes the magazine controlling wing portion 16 and an opposite wing portion 138, the wing portions 16 and 138 being both offset from the plane of the cam plate 17 so as to occupy a plane above the slide bar 125. The L-shape slot 15 formed in the wing portion 16 of the cam plate 17 receives the upstanding crank pin 14 carried by the crank arm 13 whereby the magazine is periodically actuated in response to the reciprocatory movement of the slide bar 125. The opposite wing portion 138 of the cam plate 17 is provided with a roller 139 rotatably mounted on the underside thereof and an upstanding pin 140 secured to the upper side thereof, both of which engage and operate a plurality of levers hereinafter described.

A pair of pins 141 and 142 are doweled in the slide bar 125 substantially centrally of its width and to one side of the ends of the slot 133 therein. The pins 141 and 142 depend from the underside of the slide bar 125 into a slot 143 formed in the assembly plate 2. The U-shape opening 135 in the assembly plate 2, previously described, opens into or communicates with the slot 143 at a point intermediate its ends as clearly shown in Fig. 12.

The lever 78, previously described in connection with the standards 72, is pivoted at one end to the underside of the base plate 2 in such a position that the notched opening 77 formed therein registers with the U-shape opening 135 in the base plate 2. This permits passage of one of the standards 72 through the openings 77 and 135 with the pointed free end 144 of the lever 78 extended across the slot 143 so as to lie between and in the path of the pins 141 and 142 carried by the slide bar 125. The purpose of the pins 141 and 142 is to rotate the lever 78 about its pivot alternately, first counter-clockwise and then clockwise, upon a reciprocatory movement of the slide bar 125.

An upstanding pin 145 is fixed to the slide bar 125 adjacent its end 129 for co-action with a hook 146 formed on the end of one arm 147 of the T-shape lever 79 which is pivoted on the upper side of the assembly plate 2 at 148. An opening formed in and adjacent the pivoted end of the lever 79 for passage therethrough of an upstanding pin 149 fixed to the assembly plate 2 limits the rotary movement of the lever 79 about its pivot 148. The edge of the opening 77 in the remaining end of the lever 79 is also provided with a complemental keyway or notch which registers with an opening in the assembly plate 2 beneath the opening 77 for a purpose hereinafter described.

Near the end of the movement of the slide bar 125 into the position shown in Fig. 12, the pin 145 moves the hook 146 formed on the end of the arm 147 of the T-shape lever 79 and imparts a limited counter-clockwise movement to the lever 79. Near the end of the return movement of the slide bar 65 to the position indicated in Fig. 11, the pin 145 again moves the lever 79 to impart a clockwise movement thereto.

A pair of slotted studs 150 are secured to the assembly plate 2 and depend from the underside thereof for pivotally supporting the cam levers 76 in a position substantially in alignment with the standards 72. In their normal position, as indicated in Fig. 14, the cam levers 76 are disposed in an inclined position with the hooked end 151 of the right hand cam lever 76 extended above the rear edge of the assembly plate 2 and with the hooked end 152 of the other cam lever 76 extended through an aperture 153 in the assembly plate 2 and into the slot 126 formed in the slide bar 125. When the slide bar 125 is moved into the position shown in Fig. 15, it will ride over the hooked ends 151 and 152 to depress them and thus elevate the ends 153 of the cam levers 76 in a manner clearly shown in Fig. 15.

Figure 9:
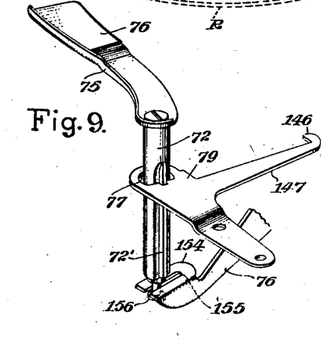
Fig. 9 is a detail perspective view of one of the record elevating members and the means for elevating as well as rotating the same.
Figure 10:
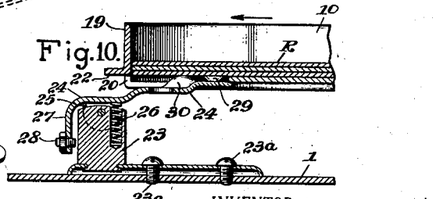
Fig. 10 is an enlarged fragmentary sectional detail view of the record transfer lever illustrating the cooperative relation between the magazine and the transfer lever with the lowermost record in the magazine partly dislodged by the transfer lever.

The ends 153 have a portion thereof bent out of the plane occupied by the levers 76 to provide laterally extending ears 154 which are each provided with an inwardly extending slot 155, as clearly shown in Fig. 9.

Each of the standards 72, which support the record elevating fingers 74 and 75, is provided at its lower extremity with a machine screw 156 and a lock-nut 157 for each of said screws. The depending body portion of each of the screws 156, between the heads thereof and the lock-nuts 157 thereon, occupies the slot 155 in each of the ears 154, with the heads of the screws 156 beneath the ears 154 and the lock-nuts 157 above the said ears 154 whereby the ends 153 of the cam levers 76 are operatively connected to the elevating standards 72, as clearly shown in Figs. 9, 14 and 15.

Since the elevating standards 72 are each provided with a spline or key 72' which cooperates with a complemental keyway or notch formed in the edge of the openings 77, it will be readily apparent that the slide bar 125, in its reciprocating movement, actuates the cam levers 76 to elevate and lower the standards 72 and the levers 78 and 79 to subsequently rotate the standards 72 in a counter-clockwise direction after they have been elevated, and in a clockwise direction after the said standards have been lowered to their normal position of rest.

A lever 158 (Figs. 11, 12, 13 and 13a) which functions to indirectly locate the pick-up arm 37, when actuated by elements hereinafter described, is pivoted intermediate its ends and in spaced relation to the base plate 2 by means of an upstanding pivot pin 159 carried by the base plate 2 and a bearing hub which is staked or otherwise secured to the lever 158 at a point substantially centrally thereof.

The lever 158 is constantly urged in a counter-clockwise direction about its pivot pin 159 by means of a spring 160. The spring 160 is connected, at one end, to an upstanding ear 161 formed on one edge of the lever 158, and at the other end to an upstanding pin 162 forming a part of an adjustable stop member 163 carried by the base plate 2. Thus, the end portion 164 of the lever 158 is normally maintained in abutment with the stop member 163 as clearly shown in Fig. 11.

The opposite end portion of the lever 158 is provided with an opening 165 in which is movable a pin 166 upstanding from a latch lever 167 pivotally carried by the lever 158 at 168. A spring 169 is attached, at one end, to an upstanding ear 170 formed on the lever 158 and at its other end to the latch lever 167 whereby the latch lever 167 is urged in a clockwise direction relative to the lever 158. Movement of the latch lever 167 relative to the lever 158 is limited by the pin 166 and the opening 165.

The lever 158 is also provided with a bent-up end 171 to which one end of a spring blade 172 is securely attached. The opposite free end of the spring blade 172 extends toward the latch lever 167 and is adapted to coact with the hooked end portion 173 of the latch lever 167, as clearly shown in Figs. 11, 12 and 13.

The opposite end of the latch lever 167 is formed to provide a cam edge 174 adapted to engage an upstanding pin 175 carried by the base plate 2 whereby the latch lever 167 is moved to an unlatched position with respect to the free end of the spring blade 172 to free the depending pin 60 carried by the trip lever 47 from engagement with the hooked end 173 of the latch lever 167, and also to free the free end of the spring blade 172. This takes place when the lever 158 is moved to a position shown in Fig. 12, either automatically or by a cam lever which is manually positioned by the upstanding post 82 carried thereby.

A plurality of levers, generally indicated at 176 and 177, are pivoted on the assembly plate 2 in cooperative relation with the clutch plate 88, the crescent shape pawl 89, the cam plate 17 carried by the slide bar 125, and the latch lever 167 carried by the lever 158.

The lever 176 comprises three integral arms 178, 179 and 180 which extend radially from a common center or point of juncture of said arms. A bearing hub or boss 181 is staked or otherwise suitably secured to the lever 176 at the said point of juncture whereby the lever 176 is pivoted in a horizontal plane in spaced relation to the base plate 2 on an upstanding pivot pin 182.

A small roller 183 is pivoted on the free end of the arm 178 for momentary rolling contact with the periphery of the clutch plate 88, first upon initiation of a cycle of automatic operations and again immediately before the completion of said cycle of operations at which time the roller 183 remains in contact with the periphery of the clutch plate 88 and finally seats in a step 184 formed in the peripheral edge of the said clutch plate 88, simultaneously with the disengagement of the crescent pawl 89 from the driving ratchet sleeve 95. Since the clutch plate 88 ceases to rotate upon disengagement of the pawl 89 from the ratchet sleeve 95, the roller 183 coacts with the step 184 to prevent counter-clockwise movement of the clutch plate and to hold the tooth 90 on the crescent pawl 89 clear of the driving ratchet sleeve 95.

Figure 13A:
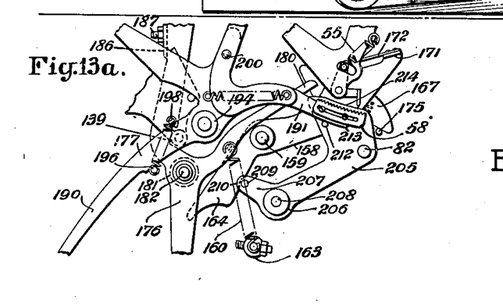
Fig. 13a is a view similar to Fig. 13 illustrating means for preventing operation of the automatic mechanism when it is desired to manually perform the functions thereof.

The arm 179 of the lever 176 is adapted to extend under the wing portion 138 of the cam plate 17 with the roller 139, on the underside of the wing portion 138, normally occupying a depression or recess 185 formed in one edge of the arm 179 at a point adjacent to the pivot pin 182 (Figs. 13 and 13a).

The opposite edge of the arm 179 includes an integral depending arm 186 which extends through a clearance opening 186a formed in the base plate 2. Adjustably attached to the lowermost end portion of the depending arm 186 is an eye screw 187 to which is attached one end of the flexible cable 67 by means of a suitable coil spring 67a, as clearly shown in Figs. 11, 12 and 13. The purpose of the coil spring 67a is to permit the cable 67 to yield or stretch in response to a sudden pull thereon.

A spring 188 is attached, at one end, to a pin carried by the outer free end of the arm 179 and its other end to an upstanding pin 189 carried by the base plate 2. The spring 188 tends to urge the lever 176 in a clockwise direction about the pivot pin 182 whereby the arm 179 is maintained in contact with the roller 139 so that the lever 176 may be controlled in accordance with the reciprocating movement of the cam plate 17.

The remaining arm 180 of the lever 176 extends toward and is adapted to coact with the upstanding pin 166 carried by the latch lever 167 to move the said latch lever in a counter-clockwise direction, relative to the lever 158, to an unlatched position near the end of a complete cycle of automatic operations to free the pin 60 whereby the spring blade 172 is free to urge the trip lever 47 in a clockwise direction.

The lever 177 comprises four arms 190, 191, 192 and 193 which extend radially from a common center or the point of juncture of said arms. A bearing hub or boss 194 is staked or otherwise suitably secured to the lever 177 at the said point of juncture of said arms whereby the lever 177 is pivoted on an upstanding pivot pin 195 on the base plate 2 in spaced relation thereto and the previously described lever 176.

The lever 177 is constantly urged in a counter-clockwise direction about the pivot pin 195 and is normally held in abutment with a stop pin 196 by means of a spring 197. The spring 197 is connected, at one end, to an upstanding pin 198 carried by the lever 177 and at the other end, to the stop pin 196 carried by the base plate 2.

In its normal position of rest, the lever 177, by means of the arm 190, engages one end of the crescent-shape pawl 89 to maintain the pawl tooth 90 out of engagement with the ratchet sleeve 95 whereby the entire mechanism assembled on the base plate 2 is disconnected from the driving spindle 6 as clearly shown in Fig. 11. When, however, a cycle of automatic operations is initiated at the end of a record selection by a reverse movement of the pick-up arm 37, as through the instrumentality of an eccentric terminal groove E carried by the record R, the lever 177 is rocked in a clockwise direction by the coaction of the pawl 50 with the serrated edge 57 of the ratchet plate 58 on the free end portion of the arm 191 to release the crescent pawl 89 for engagement with the ratchet sleeve 95 whereby the herein described mechanism is coupled to the motor driven spindle 6.

As a result thereof, the slide bar 125 is moved by the cam 85 from the position shown in Fig. 11 to that shown in Fig. 12. In this movement of the slide bar 125, the pin 140, upstanding from the wing portion 138 of the cam plate 17, engages the edge 199 of the arm 192 of the lever 177 and acts as a cam to impart a clockwise movement of predetermined extent to the lever 177 and then holds the same in the position to which it will then have been moved until the slide bar 125 returns to normal position. During the clockwise movement of the lever 177, as above described, the arm 193 thereof engages the depending pin 60 carried by the strip lever 47 to move the pick-up arm 37 to non-playing position and the depending pin 60 into latched relation with the latch lever 167. The arm 193 is pivoted to the lever 177, as at 200, and is yieldably maintained, by means of a spring 201, in a predetermined position on the lever 177 against a stop pin 202 upstanding from said lever, the spring 201 being secured at one end, to the stop pin 202, and its other end to a pin 203 carried by the opposite free end 204 of the arm 193. The purpose of pivotally mounting the arm 193 in the manner described is to protect the pick-up arm 37 against undue strain should an attempt be made to move the said arm while it is under the control of the automatic mechanism.

*Manual control*

Figure 2:
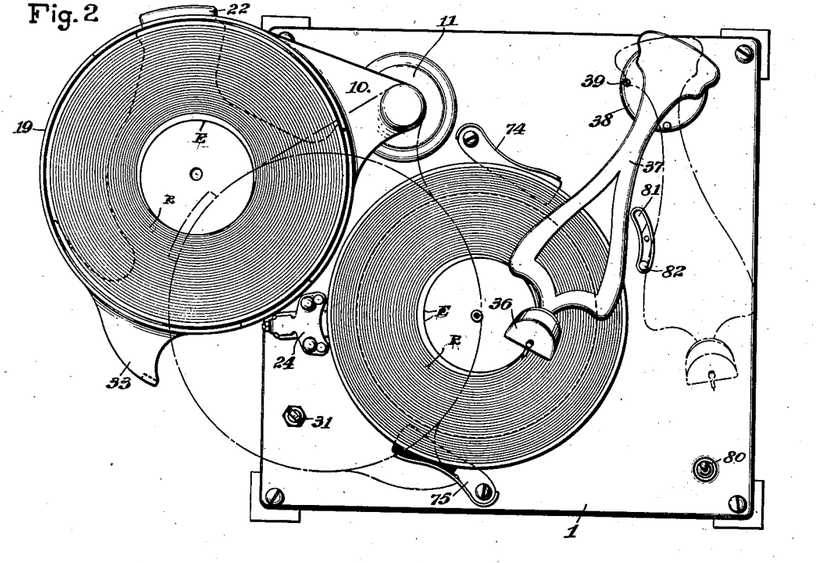
Fig. 2 is a top plan view of my improved mechanism illustrating the parts thereof in the position substantially at the completion of a period of sound reproduction, the broken lines illustrating the position of certain parts at substantially the beginning of a cycle of automatic operation.
Figure 3:
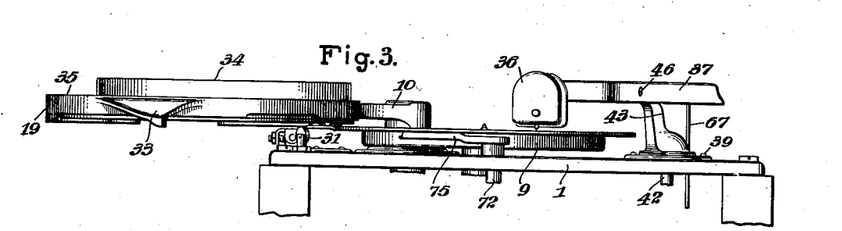
Fig. 3 is a side elevational view of the upper portion of my improved mechanism with the reproducer and record changing elements in the same position as illustrated in Fig. 2.
Figure 4:
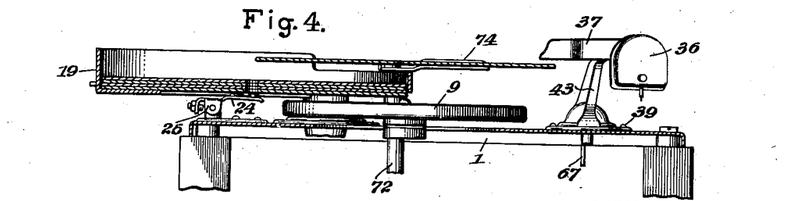
Fig. 4 is a view similar to Fig. 3 with certain parts in section and illustrating said parts in the position in which they appear in broken lines in Fig. 2.
Figure 5:
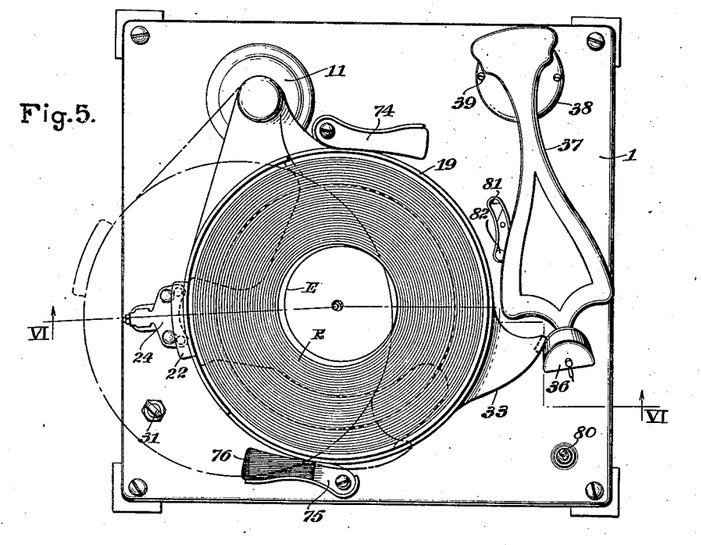
Fig. 5 is a top plan view of my improved mechanism illustrating the magazine in full line position over the turntable prior to the removal of a record from the magazine.
Figure 6:
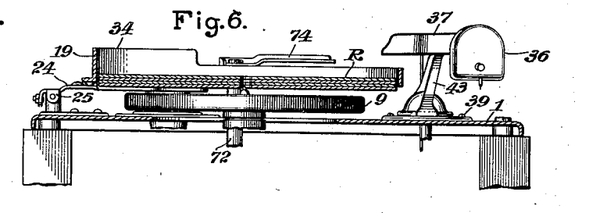
Fig. 6 is a cross-sectional view of the line VI—VI of Fig. 5 illustrating one of the elevators in raised position, the magazine in its position over the turntable, and the manner in which the magazine cooperates with the record transfer lever to adjust said lever preparatory to a record ejecting operation.
Figure 7:
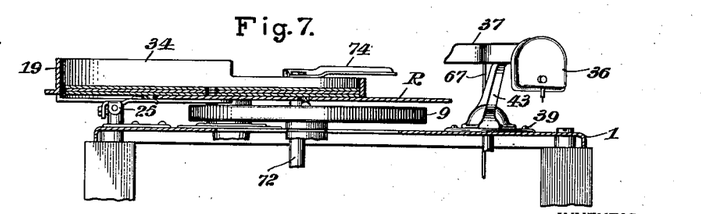
Fig. 7 is a view similar to Fig. 6 illustrating the magazine in a position shortly after the beginning of its return movement to normal position, and the manner in which the lowermost record in the magazine is ejected therefrom.

The manually controlled means previously referred to for changing the machine from automatic to manually operable condition and vice versa comprises the upstanding post 82 which is secured to a cam lever 205 now to be described, and projects through the arcuate slot 81 formed in the top plate 1, as clearly shown in Figs. 1, 2 and 5.

The cam lever 205 is pivotally mounted on the base plate 2 by means of a bearing hub or sleeve 206 which is staked or otherwise secured to the lever 205 adjacent the end 207 thereof and mounted on an upstanding pivot pin 208 carried by the base plate 2 in close proximity to the end portion 164 of the lever 158.

The end 207 of the cam lever 205 is provided with a depending pin 209 which is adapted to engage one edge of the end portion 164 of lever 158 to move the lever 158 in a clockwise direction about its pivot pin 159. The lever 158 is maintained in the position to which it is moved by the entry of the pin 209 into a notch or recess 210 formed in the said edge of the end portion 164 when the cam lever 205 is moved in a counter-clockwise direction by the manual manipulation of the upstanding post 82 in the slot 81 in the direction of the arrow as indicated in Fig. 5. The slot 81 prevents further movement of the lever 82 than is necessary to cause the pin 209 to enter the notch or recess 210

The other end portion 211 of the cam lever 205 is provided with a short upstanding pin 212 which is adapted to be positioned against the rear edge 213 of the arm 191 when the cam lever 205 is moved to the manual record playing position as clearly shown in Fig. 13a.

When the cam lever 205 is in the manual record playing condition, as shown in Fig. 13a, the curved edge 214 formed on the end portion 211 of the cam lever 205 is positioned under the free end portion of the arm 191 with the curved edge 214 thereof extending slightly beyond the toothed edge 57 of the ratchet plate 58 to prevent the pawl 50 from engaging the toothed edge 57 of the said ratchet plate 58 by engaging the curved edge 214 instead.

It will be noted, from an inspection of Figs. 1, 2 and 5, that the slot 81 is so arranged in the motor-board 1 that it is eccentric to the spindle 6, or the center of the turntable. While it is possible to design the machine herein described to play either 10-inch or 12-inch records automatically, I have illustrated a machine which plays only 10-inch records automatically. However, when the post 82 is moved from its position shown in Figs. 1, 2 and 5 to the other end of the slot 81, the distance therefrom to the spindle 6 is increased, so that the larger records can be accommodated. It is necessary, however, to play the larger records manually unless the magazine 10 is initially designed to accommodate 12-inch records and the operating parts modified accordingly.

*Mechanism for controlling the pick-up arm*

The elements herein described for raising the pick-up from a record tablet after the latter has been reproduced, swinging the pick-up arm clear of the record, returning the said arm inwardly to a position to engage the beginning of the sound groove of the next record to be reproduced, and thereafter lowering the stylus carried by the pick-up into engagement with the blank edge portion of the record tablet and substantially simultaneously urging the pick-up arm inwardly to bring the stylus carried by the pick-up into engagement with the beginning of the sound record groove will now be described.

The arm 64, hereinbefore described, is pivoted to the underside of the base plate 2 in spaced relation thereto by means of a bearing hub or sleeve 216, which is staked or otherwise secured to one end of the arm 64, and a shouldered pivot stud 217 which is riveted to the base plate 2. Rotatably mounted on the lowermost shouldered end of the pivot stud 217 by means of a shouldered pivot screw 218, which is threaded into the end of the stud 217, is the pulley 66, also hereinbefore described. By this construction, the pulley 66 is able to follow the movements of the pick-up arm 37 to which movement is imparted by the cable 67 which passes around the pulleys 66 and 69 and connects the eye screw 187 with the pick-up arm 37, as at 215.

Assume, now, that the turntable 9 is rotating and that the reproduction of a record tablet carried by the turntable has been concluded. The stylus S carried by the pick-up device 36 enters the eccentric terminal groove E immediately thereafter and imparts a series of forward and reverse movements to the pick-up arm 37. Since the trip lever 47 moves with the pick-up arm 37 and the supporting post 43, the pawl 50, carried by the trip lever 47, coacts with the ratchet plate 58 carried by the arm 191 of the lever 177 during a reverse movement of the pick-up arm 37 to rock the lever 177 in a clockwise direction about the pivot pin 195 to release the arm 190 of the lever 177 from engagement with the crescent-shaped pawl 89.

Upon such disengagement of the arm 190 from the crescent pawl 89, the tooth 90 formed on the crescent pawl 89 enters one of the notches 96 formed in the driving ratchet sleeve 95 to connect the cam 85 with the spindle 6. Rotation of the cam 85 will now move the slide bar 125 to the position shown in Fig. 12. During this movement of the slide bar 125, the cam plate 17 has moved the three armed lever 176 in a counter-clockwise direction to pull the cable 67 to the left as seen in Fig. 12 whereby the pick-up arm 37 is elevated from the record.

Substantially simultaneously with the movement of the three armed lever 176 in a counter-clockwise direction by the cam plate 17, the upstanding pin 140 carried by the cam plate 17 engages the arm 192 of the four armed lever 177 to rotate the said lever in a clockwise direction whereby the arm 193 of the four armed lever 177 engages the depending pin 60 carried on one end of the trip lever 47 and moves the trip lever 47 in a counter-clockwise direction whereby the pick-up arm 37 is moved to a position to one side of the turntable 9, as shown in dotted lines in Fig. 12.

During counter-clockwise movement of the trip lever 47, the latch lever 167 moves into a position where its hooked end 173 cooperates with the pin 60 to temporarily lock the pick-up arm 37 in its position to one side of the turntable 9, so that a record changing operation may be performed. Upon the return movement of the slide bar 125 from the position shown in Fig. 12 to that shown in Fig. 11, the upstanding pin 140 on the cam plate 17 permits the lever 177 to be moved by the spring 197 in a counter-clockwise direction, thus permitting the lever 158 to indirectly move the pick-up arm inwardly to a position over the blank edge of the next record deposited on the turntable 9.

By the time the inward movement of the pick-up arm 37 has taken place, the roller 139, pivoted to the underside of the wing portion 138 of the cam plate 17, has returned from the outer end of the arm 179 to the recess 185 formed in one edge of the arm 179 to permit the spring 188 to move the arm 179 in a clockwise direction to slacken the flexible cable 67 and thereby lower the pick-up arm 37 and the stylus S into cooperative relation with the blank edge of the next record on the turntable to be reproduced. When the lever 176 has returned to its normal position, as shown in Fig. 11, under the action of the spring 188, the arm 180 thereof again engages the upstanding pin 166 and moves the latch lever 167 in a clockwise direction against the action of the spring 169 to release the hooked end 173 from engagement with the depending pin 60 carried by the trip lever 47. As soon as this occurs, the spring blade 172, carried by the lever 158, is free to urge the trip lever slightly in a clockwise direction whereby the pick-up arm 37 is given a slight inward movement toward the turntable spindle 6 to urge the stylus S into the beginning of the record sound groove.

*Mechanism for controlling the magazine*

The elements herein described which cooperate to move the magazine 10 to a position directly over the turntable 9, in spaced relation thereto, and back to its normal position of rest, will now be described.

The crank arm 13 which is secured to the lowermost end of the magazine pivot post 12 is so positioned on the pivot post 12 that the upstanding crank pin 14 carried by the crank arm 13 extends into the L-shape slot 15 formed in the wing portion 16 of the cam plate 17. During the movement of the slide bar 125 from the position shown in Fig. 11 to that shown in Fig. 12, the L-shape slot 15 functions to move the crank arm 13 in a counter-clockwise direction whereby the magazine 10 is moved to a position directly over the turntable 9. While the magazine is being so moved, the record transfer lever 24, which is pivotally mounted on the top plate 1 to one side of the turntable 9, engages the underside of the lowermost record in the magazine and is held in a depressed position until just before the magazine has completed its movement to a position directly over the turntable.

Shortly before the magazine 9 has reached the limit of its movement to a position over the turntable, the edge of the lowermost record in the magazine has passed over the laterally extending free end of the record transfer lever 24 whereby the said record transfer lever is free to swing upwardly about its pivot in response to the spring 26 to engage the heel plate 22. As the slide bar 125 returns from the position shown in Fig. 12 to that shown in Fig. 11, the cam plate 17, by reason of the L-shape slot 15 formed therein, cooperates with the crank pin 14 to rotate the crank arm 13 in a clockwise direction to return the magazine to its normal position to one side of the turntable, as clearly shown in Fig. 1.

At the beginning of this return movement of the magazine to its normal position, the periphery of the lowermost record in the magazine engages the buttons 29 of the record transfer lever 24 whereby the said lowermost record is held in its position directly over the turntable 9, and since the magazine is now moving to its normal position, the lowermost record is ejected laterally out of the magazine through the cutaway portion 21 by the cooperation of the magazine with the record transfer lever 24. As the lowermost record is ejected from the magazine, the laterally projecting finger 33 formed on the outer periphery of the magazine rim 19 engages the peripheral edge of the said lowermost record while the magazine 10 moves toward normal position, whereby the lowermost record is maintained substantially centrally over the turntable 9. The yieldable pin 113 disposed in the uppermost end of the spindle 6 cooperates with the finger 33 and thus also assists in the proper centering of the ejected record over the turntable.

Mechanism for controlling the record elevating fingers

Immediately after the pick-up arm 37 is returned to an inoperative position to one side of the turntable after a period of sound reproduction and the initiation of a cycle of automatic operations begun, the slide bar 125, in its movement from the position shown in Fig. 11 to that shown in Fig. 12, passes over the hooked ends 151 and 152 of the cam levers 76 whereby the said cam levers are rotated from the position shown in Fig. 14 to the position shown in Fig. 15. The slotted ends of the cam levers 76, thereupon cooperate with the lowermost ends of the vertically reciprocable standards 72 to elevate the said standards and the record engaging fingers 74 and 75 carried thereby, so that a record positioned on the turntable is raised to a height sufficient to permit the passage of the magazine 10 between the turntable and the elevated record.

Shortly before the slide bar 125 has moved from the position shown in Fig. 11 to the extreme outward position shown in Fig. 12, the pin 142, which depends from the slide bar 125 and operates in the slot 143, strikes the free end of the lever 78 whereby the rear standard 72 is rotated in a counter-clockwise direction until it is free of the elevated record. Simultaneously with this movement of the lever 78, the upstanding pin 145 carried by the end 129 of the slide bar 125 engages the hooked end 146 of the arm 147 of the lever 79 and rocks the said lever in a clockwise direction to rotate the front standard 72 and the record elevating finger 75 carried thereby also in a counter-clockwise direction until free of the elevated record. Since the elevated record is now without any support, it is free to fall into the magazine, already in a position therebelow and substantially coaxial therewith.

Complete cycle of automatic operations

Assume that the magazine 10 is loaded with a plurality of records to be played, and that the toggle switch 80 has been moved to "on" position to energize the motor 5 and thereby cause the turntable 9 to rotate. The pick-up arm 37 is grasped manually and moved from its outermost inoperative position, as shown in broken lines in Fig. 12, toward the turntable spindle 6 and then given a slight reverse movement to cause the trip lever 47 to release the arm 190 from engagement with the crescent pawl 89 to couple the motor to the mechanism assembled on the base plate 2.

Immediately after the pick-up arm 37 has been given a slight reverse movement manually as above described, the pick-up arm 37 will be elevated by the cable 67 and returned to its outermost inoperative position, the record elevating fingers 74 and 75 will be moved upwardly to their full elevated position as shown in Fig. 15, rotated simultaneously in a counter-clockwise direction, and the magazine moved from its normal position, to a position directly over the turntable. Upon return movement of the magazine, which takes place almost immediately after it has reached its position over the turntable, the lowermost record in the magazine will be deposited on the turntable by the cooperation of the record transfer lever 24 and the pin 113 with the magazine 10 as it returns to its normal position, the record elevating fingers being first lowered and finally rotated in a clockwise direction to their normal position of rest, so that the ejected record can fall onto the turntable under the influence of gravity. The pick-up arm then swings inwardly to a position where the stylus S is directly over the blank edge of the record, and is subsequently lowered to cause the stylus S to engage the blank edge of the record now on the turntable. The pick-up arm 37 finally is urged gently inwardly by the coaction of the spring blade 172 with the trip lever 47 to cause the stylus S to engage the beginning of the record sound groove whereupon a period of sound reproduction follows. At the completion of playing of the record, the pick-up arm 37 is given a reverse movement by the eccentric groove E, whereupon the automatic mechanism is set into operation again and the cycle repeated.

An auxiliary control switch 219 for the motor circuit is provided for the purpose of preventing interruption of a cycle of automatic operations before the completion thereof by movement of the toggle switch 80 to "off" position. The auxiliary switch 219 is connected in parallel with the toggle switch 80 and secured to the base plate 2 in cooperative relation with the wing portion 16 of the cam plate 17 by means of suitable screws or the like as clearly shown in Figs. 11 and 12. The rigid contact finger 220 and the resilient contact finger 221 of the auxiliary switch 219 are shown separated in Fig. 11 by the action of the wing portion 16 of the cam plate 17 through the insulated finger actuating pawl 222 of the switch 219. In this position, the slide bar 125 and the cam plate 17 carried thereby are in their normal position of rest.

In Fig. 12, the slide bar 125 and the cam plate 17 are shown at the limit of movement in one direction during a cycle of automatic operations and with the switch contact fingers 220 and 221 in contacting relation. Should the toggle switch 80 now be moved to "off" position, the motor circuit would, nevertheless, remain closed until the return of the slide bar to its normal position of rest, as shown in Fig. 11. When the slide bar 125 has reached this position, the wing portion 16 of the cam plate 17 has engaged and urged the pawl 222 in a clockwise direction against the spring action of the resilient contact finger 221 to separate the contact fingers 220 and 221 of the auxiliary switch 219 whereby the motor circuit is opened irrespective of the position of the toggle switch 80 at substantially the moment when the crescent pawl 89 is disengaged from the driving ratchet sleeve 95. This action occurs at the moment the cycle of automatic operations has been completed.

While I have shown and described one specific embodiment of my invention, I am fully aware that many modifications thereof are possible. For example, where the machine is initially designed to play 12-inch records automatically, it is possible also to play smaller size records thereon, also automatically, by making use of a record holder of the type shown, for example, in Fig. 5 of the U. S. patent to Kauffman, No. 1,683,469. My invention, therefore, is not to be restricted except insofar as is necessitated by the prior art and by the spirit of the appended claims.

I claim:

1. In an automatic mechanism of the character described, a turntable spindle, a clutch mechanism including a pair of cooperable elements one of which is normally stationary and the other of which is mounted on said spindle for rotation therewith, yieldable means constantly tending to force said cooperable elements into engagement with each other whereby to cause rotation of said normally stationary element, a turntable for said spindle, a sound reproducing instrumentality, a reciprocable member, a cam follower on said member, a cam loosely mounted on said spindle and engaging said cam follower, said cam being coupled to said normally stationary element for rotation therewith and being so shaped as to reciprocate said member in response to rotation of said normally stationary member, a control lever, means carried by said member whereby said lever is moved periodically in response to reciprocal movement of said member, means carried by said lever adapted, when in substantially normal position, to engage said normally stationary element whereby said element is maintained out of engagement with the other of said clutch elements against the action of said yieldable means, and flexible means connecting said instrumentality and said lever, whereby said instrumentality is raised and lowered with respect to said turntable in accordance with the movement of said lever.

2. In an automatic mechanism of the character described, a turntable spindle, a clutch mechanism including a pair of cooperable elements one of which is normally stationary and the other of which is mounted on said spindle for rotation therewith, yieldable means constantly tending to force said cooperable elements into engagement with each other whereby to cause rotation of said normally stationary element, a turntable for said spindle, a pivotally mounted sound reproducing instrumentality, a reciprocable member, a cam follower on said member, a cam loosely mounted on said spindle and engaging said cam follower, said cam being coupled to said normally stationary element for rotation therewith and being so shaped as to reciprocate said member in response to rotation of said normally stationary member, a control lever, means carried by said member whereby said lever is moved periodically in response to reciprocal movement of said member, means carried by said lever adapted, when in substantially normal position, to engage said normally stationary element whereby said element is maintained out of engagement with the other of said clutch elements against the action of said yieldable means, flexible means connecting said instrumentality and said lever, whereby said instrumentality is raised and lowered with respect to said turntable in accordance with the movement of said lever, and means controlled by said instrumentality for guiding said flexible means in accordance with the swinging movement of said instrumentality.

3. In an automatic phonograph including a turntable spindle, a sound reproducing instrumentality adapted for vertical and horizontal movement, means for positively controlling vertical movement of said instrumentality, means for positively controlling horizontal movement of said instrumentality, means controlled by said spindle for periodically actuating said first and second named means and means associated with each of said positive control means yieldable when said instrumentality is held against movement in either one of said directions during the automatic operation of said phonograph to prevent injury thereto.

4. In a machine of the character described, a turntable, a magazine movable to and from a position over the turntable, elevator means for lifting a record from the turntable, means operable to withdraw the elevator means from the record so as to deposit the same in the magazine when the latter is directly over the turntable, and means integral with said magazine for guiding a record thereinto.

5. In a machine of the character described, a turntable, a record magazine movable to and from position for discharging a record therefrom onto said turntable and comprising an annular rim, spaced record supporting ledges extending inwardly of and spaced from the bottom face of said rim, and yieldably mounted means fixed in the path of and controlled by said rim for causing a record to emerge laterally from said magazine during a part of one of said movements.

6. In an automatic phonograph, the combination of a turntable, a pivoted record magazine adapted to receive a stack of records and to swing said stack to and from a position over said turntable, a yieldably mounted record dislodging lever disposed in the path of movement of said magazine, said lever being depressed by the lowermost record of said stack as said magazine moves toward a position in coaxial alignment with said turntable, means on said magazine displaced from the lowermost record substantially the thickness thereof for engaging said lever after the magazine has moved with said lowermost record beyond said lever and into a position in co-axial alignment with said turntable to maintain said lever in position to engage the peripheral edge of said lowermost record whereby to prevent movement of said lowermost record from a position in co-axial alignment with said turntable when said magazine returns to its normal position, and guide means integral with the periphery of said magazine adapted to cooperate with said lever and magazine to maintain said lowermost record located over said turntable.

7. The combination with a turntable having a spindle of means for carrying a plurality of records in super-imposed relation, means for moving said record carrying means from a normal position to a position over the turntable in a plane parallel with the face of the turntable to locate a record on said spindle, and means integral with said first named means for maintaining the record so located until said first named means has moved through a major portion of its return movement to normal position.

8. The combination with a turntable having a spindle of a magazine for carrying a plurality of records in super-imposed relation, means for moving said magazine from a normal position to a position over the turntable in a plane parallel with the face of the turntable to locate a record on said spindle, means yieldably carried by said spindle and adapted to enter the center opening in said record when said magazine is in a position substantially axially of said turntable, and means integral with said magazine adapted to contact with the periphery of said record to assist in maintaining the record so located until said magazine has moved through a major portion of its return movement to normal position.

9. In an automatic phonograph, a turntable including a center pin having a yieldable tip, a record supporting magazine pivotally mounted for movement between a normal position and a position over said turntable for discharging a record thereon, said yieldable tip being adapted to coact with the lowermost record in said magazine during a part of its movement to and from said turntable for maintaining said lowermost record substantially centrally of said turntable, and means integral with said magazine for assisting said tip in centering the lowermost record on said center pin and turntable during the return movement of said magazine to normal position.

10. The combination with a turntable having a spindle of a magazine for carrying a plurality of records in super-imposed relation, means for moving said magazine from a normal position to a position over the turntable in a plane parallel with the face of the turntable to locate a record on said spindle, and means carried by said spindle and said magazine for maintaining a record so located until said magazine has moved through a major portion of its return movement to normal position.

11. In an automatic phonograph, a turntable, a magazine for supporting a stack of records, said magazine having a surrounding side wall and a partially open bottom and being movable between a normal position and a position substantially in co-axial alignment with said turntable, means for dislodging a record from said magazine onto said turntable comprising a yieldably mounted lever, means carried by said lever for engaging the peripheral edge of a record, and means carried by said magazine for maintaining said lever depressed after the surrounding side wall of said magazine has passed beyond the record engaging end of said lever and said magazine has reached a position substantially in co-axial alignment with said turntable to permit said lever to engage the edge of a record whereby to dislodge said record from said magazine upon the return movement of said magazine to normal position.

12. In a machine of the character described, a turntable, a magazine having an open bottom, means for supporting a stack of records in the magazine so as to be dislodgable through said open bottom, said magazine being movable to and from position to discharge a record onto the turntable, a yieldably mounted record dislodging lever disposed in the path of movement of said magazine and adapted to be depressed by the lowermost record of said stack during a part of one of said movements, and means integral with and projecting laterally from the outer peripheral edge of said magazine above the lowermost record substantially the thickness thereof for engaging said lever and locating said lever in the path of said lowermost record after said outer peripheral edge has passed beyond the record engaging end of said lever and said magazine has reached a position directly over said turntable to permit said lever to engage the peripheral edge of said lowermost record for dislodging a record out of said magazine onto the turntable during a part of the other of said movements.

13. In combination with a turntable having a center pin and adapted to receive a record thereon, a magazine carrying a plurality of records in superposed relation, means for pivotally mounting said magazine adjacent to and in a plane above that of said turntable, means for swinging said magazine over said turntable, a record indexing means yieldably mounted in the path of movement of said magazine and adapted to be actuated by the lowermost record in said magazine, and means extending laterally from the outer periphery of said magazine for maintaining said indexing means in actuated condition after the outer peripheral edge of said magazine has passed beyond said indexing means and said magazine has been positioned directly over said turntable for dislodging the lowermost one of the magazine carried records from the magazine onto said pin as said magazine moves away from said turntable.

14. In a machine of the character described, a turntable, a record magazine movable to and from position for discharging a record therefrom onto said turntable and comprising an annular rim, spaced record supporting ledges extending inwardly of and spaced from the bottom face of said rim, a yieldably mounted lever disposed in the path of movement of said magazine, means carried by said lever for engaging the peripheral edge of a record, and means projecting beyond the outer periphery of said annular rim adapted to depress said lever a distance below the supporting surface of said ledges equal to the thickness of the lowermost record in said magazine whereby said first named means will engage and dislodge a record from said magazine during a part of one of said movements.

15. In combination, a turntable, a record magazine movable to and from position for discharging a record therefrom onto said turntable and comprising an annular rim, spaced record supporting ledges extending inwardly of and spaced from the bottom face of said rim, a yieldably mounted lever disposed in the path of movement of said magazine, means carried by said lever for engaging the peripheral edge of a record, means projecting beyond the outer periphery of said rim adapted to depress said lever a distance below the supporting surface of said ledges equal to the thickness of the lowermost record in said magazine whereby said first named means will engage and dislodge a record from said magazine during a part of one of said movements, and roller means disposed adjacent to said lever and substantially in the path of movement of said magazine adapted to be engaged by said magazine during said movements whereby said magazine is accurately maintained in spaced relation to said lever.

BENJAMIN R. CARSON.